Jan. 17, 1928. 1,656,254
O. F. WEISS
DIRECTION SIGNAL FOR VEHICLES
Filed June 25, 1927
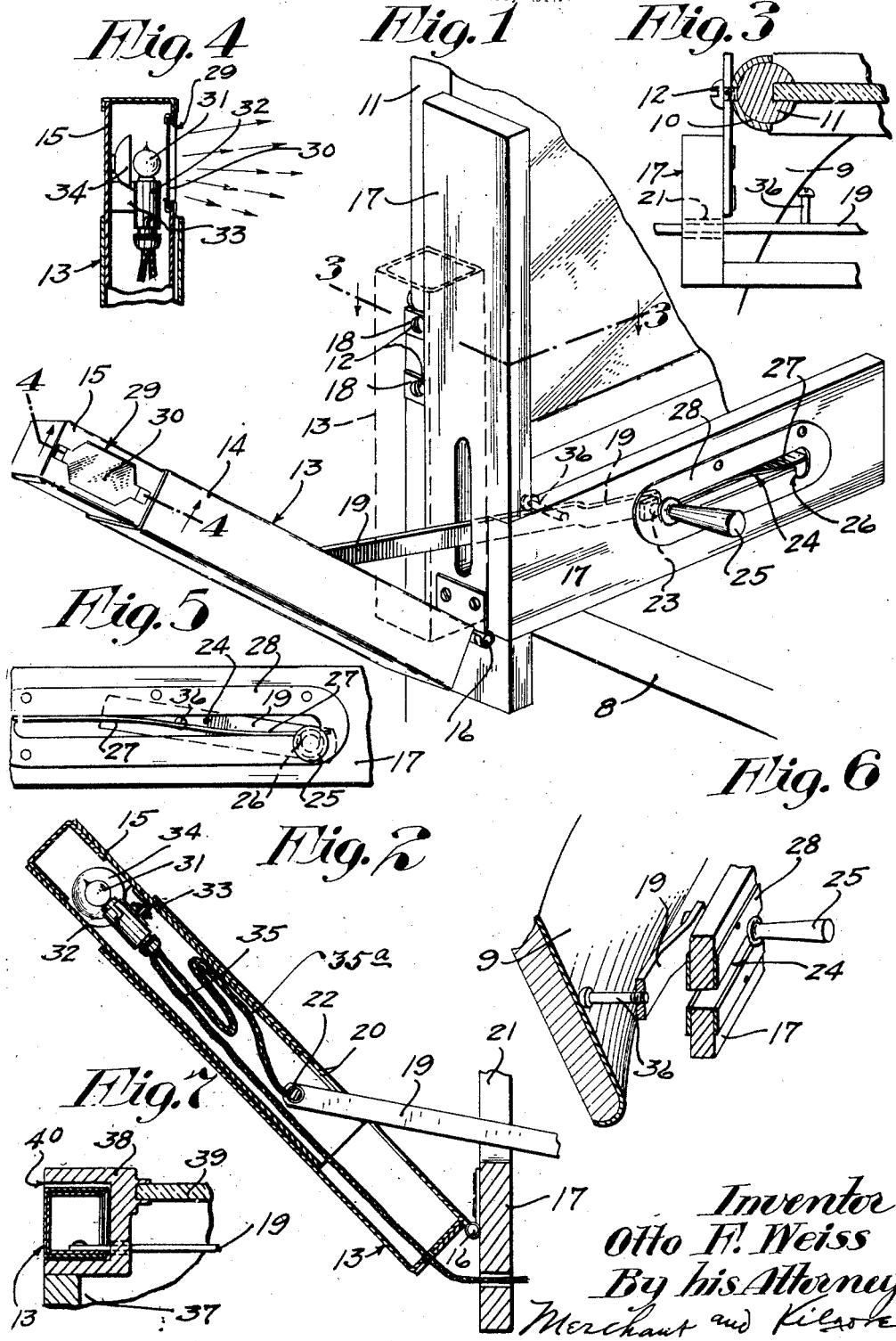
Inventor
Otto F. Weiss
By his Attorneys
Merchant and Kilgore Patented Jan. 17, 1928.

1,656,254

UNITED STATES PATENT OFFICE.

OTTO F. WEISS, OF NEW ULM, MINNESOTA.

DIRECTION SIGNAL FOR VEHICLES.

Application filed June 25, 1927. Serial No. 201,468.

My invention has for its object to provide a simple and highly efficient direction signal for vehicles, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary perspective view showing the direction signal attached to an automobile of the touring type, with some parts of said signal shown in different positions by means of broken lines;

Fig. 2 is a view of the direction signal in central longitudinal section;

Fig. 3 is a fragmentary detail view partly in plan and partly in section taken on the line 3—3 of Fig. 1;

Fig. 4 is a detail view with some parts sectioned on the line 4—4 of Fig. 1;

Fig. 5 is a fragmentary detail view showing the operating link and handle in a different position from that shown in Fig. 1;

Fig. 6 is a fragmentary perspective view showing the operative connections for the signal and ground contact for the light bulb; and Fig. 7 is a fragmentary detail view principally in section showing the direction signal applied to a vehicle having a closed body.

Referring first to the invention as shown in Figs. 1 to 6, inclusive, there is fragmentarily illustrated the left-hand portion of an automobile of the touring type, and of the parts thereof, the numeral 8 indicates the body, 9 the curved portion of the hood, 10 the wind shield post, 11 the wind shield, and 12 the screws attaching said wind shield to said post.

The direction signal illustrated is designed and mounted for use to indicate left-hand turns, and includes an arm 13 mounted for swinging movement in a vertical plane transversely of the vehicle to be positioned in an upright inoperative position, as shown by broken lines in Fig. 1, or an oblique operative position, as shown by full lines in said figure.

The arm 13 comprises an inner section 14 and an outer section 15, the former of which is hinged at 16 to the upright member of an L-shaped bracket 17. Said arm sections 14 and 15 are tubular, square in cross section, and the outer section 15 is telescoped into the inner section 14 for longitudinal sliding movement and is held from turning in said inner section by its rectangular engagement therebetween.

The horizontal member of the bracket 17 extends transversely into the vehicle body 8 and rests on the upper edge portion of the left side of said body. The upright member of the bracket 17, at its lower end portion, engages the outer face of the respective side of the body 8 and is provided with a pair of anchoring straps 18 attached to the post 11 by the screws 12.

The arm 13 is operated and held in either an operative or inoperative position by a horizontal link 19 which extends transversely of the body 8 and works through aligned slots 20 in the inner faces of the arm sections 14 and 15 and a slot 21 in the upright member of the bracket 17, and is attached to the outer arm section 15 by a transverse pivot pin 22, the ends of which are anchored in the sides of said section. On the inner end portion of the link 19 is a laterally-projecting lock stud 23 which extends through a horizontal slot 24 in the horizontal member of the bracket 17 for compound pivotal and sliding movements.

Formed with the lock stud 23 is a handle 25 by which the link 19 may be operated to swing the arm 13 to and from an operative position. To lock the link 19 with the arm 13 in a raised inoperative position, as indicated by broken lines in Fig. 1, there is formed in the bracket 17 at the inner end of the slot 24, a lock shoulder 26 arranged to be engaged by the stud 23, as shown in Fig. 5. A flat spring 27 in the slot 24 is arranged to be engaged by the lock stud 23 and automatically move said stud back of said lock shoulder 26 at the limit of the inward movement of the link 19. To release the lock stud 23 from the lock shoulder 26, it is only necessary to lift on the handle 25 sufficiently to overcome the spring 27. The outer end of the slot 24 affords a stop for the lock stud 23 to limit the outward swinging movement of the arm 13 and hold the same in an oblique operative position. Wearing plates 28 are applied to the sides of the bracket 17 for the lock stud 23.

Formed in the back of the outer arm section 15, near the top thereof, is a light opening 29, closed by a transparent panel 30 of red glass, celluloid, or other material. An electric lamp or light bulb 31 in the outer arm section 15, is mounted in a socket 32 on a bracket 33 in said outer arm section, and supports said light bulb directly back of the light opening 29. A reflector 34 for the light bulb 31 is secured within the outer arm section 15, as best shown in Fig. 4. Either the panel 30 or the light bulb 31 will be colored red, as a warning visible through the light opening 29 when the outer arm section 15 is projected.

One of the terminals of the lamp socket 32 is connected by a wire 35 to the battery or magneto of the automobile, not shown. The other terminal thereof is connected by a wire 35ª to the pivot pin 22 and is grounded through the link 19, and the body of the vehicle by means of a contact pin 36 attached to the link 19 and arranged to engage the curved metal portion 9 of the dash at the limit of the outward movement of the arm 13 to complete the circuit to the bulb 31. The initial inward movement of the arm 13 will move the contact pin 36 out of engagement with the dash 9 and break the circuit to the light bulb 31.

Normally the arm 13 is held in an inoperative upright position, as shown by broken lines in Fig. 1, by the engagement of the lock stud 23 with the lock shoulder 26. In this position of the arm 13, the outer arm section 15 is entirely within the inner arm section 14 and hence the light opening 29 is covered.

In case the driver intends to make a left-hand turn, he grasps the handle 25, lifts the same to move the lock stud 23 out of engagement with the lock shoulder 26, against the tension of the spring 27, and then moves said handle to the left to operate the link 19 and swing the arm 13 outward. At the time the lock stud 23 reaches the outer end of the slot 24, it is stopped thereby and holds the arm 13 in an oblique operative position, as shown by full lines in Figs. 1 and 2. During the outer swinging movements of the arm 13, by the link 19, said link also projects the outer arm section 15 out of the inner arm section 14 and thereby uncovers the light opening 29 which is illuminated by the light bulb 31, as previously described. In this position of the arm 13, the red light shining through the opening 29 is clearly visible from the rear of the automobile to which the direction signal is attached. It is, of course, understood that one of these direction signals may be attached to the right-hand side of the vehicle so that the operator can indicate both left and right-hand turns.

Referring now to the modification shown in Fig. 7, the numeral 37 indicates a closed vehicle body, 38 the left-hand corner post thereof, and 39 the wind shield. A recess 40 is formed in the outer face of the post 38 to receive the arm 13 when in an upright inoperative position.

What I claim is:

1. A direction signal for vehicles including a longitudinally extensible and contractable swingable arm, and a common operating connection for simultaneously swinging said arm and for extending and contracting the same.

2. A direction signal for vehicles including an arm comprising a hinged inner section and an outer section slidably mounted in said inner section, and a common operating connection for simultaneously swinging the arm and for projecting and retracting the inner section thereof.

3. The combination with a support, of a direction signal including an arm comprising an inner section hinged to the support for vertical swinging movement and an outer section slidably mounted in said inner section, and an operating link mounted on the support for compound pivotal and sliding movements and pivotally attached to the support.

4. The structure defined in claim 3 in which the sliding movement of the link on the support is limited to position the arm in either its operative or inoperative position.

5. The combination with a support having a guide slot and a lock notch at one end thereof, of a direction signal including an arm comprising an inner section hinged to the support for vertical swinging movement and an outer section slidably mounted in said inner section, and an operating link having a lock stud mounted in the guide slot for pivotal and sliding movements and pivotally attached to the support, said support at the end of the guide slot affording stops that limit the sliding movement of the lock stud and position the arm in either its operative or inoperative positions, said lock stud being arranged to enter the lock notch and hold the link with the arm in its inoperative position.

6. A direction signal for vehicles including an arm comprising a hinged inner section and an outer section slidably mounted in said inner section, said outer section having a light passage normally closed by said inner section, and an operating connection for simultaneously swinging said arm and for projecting and retracting the inner section thereof.

In testimony whereof I affix my signature.

OTTO F. WEISS.